Sept. 1, 1931. N. R. LILLIG 1,821,312
LOCK WASHER
Filed Feb. 28, 1931
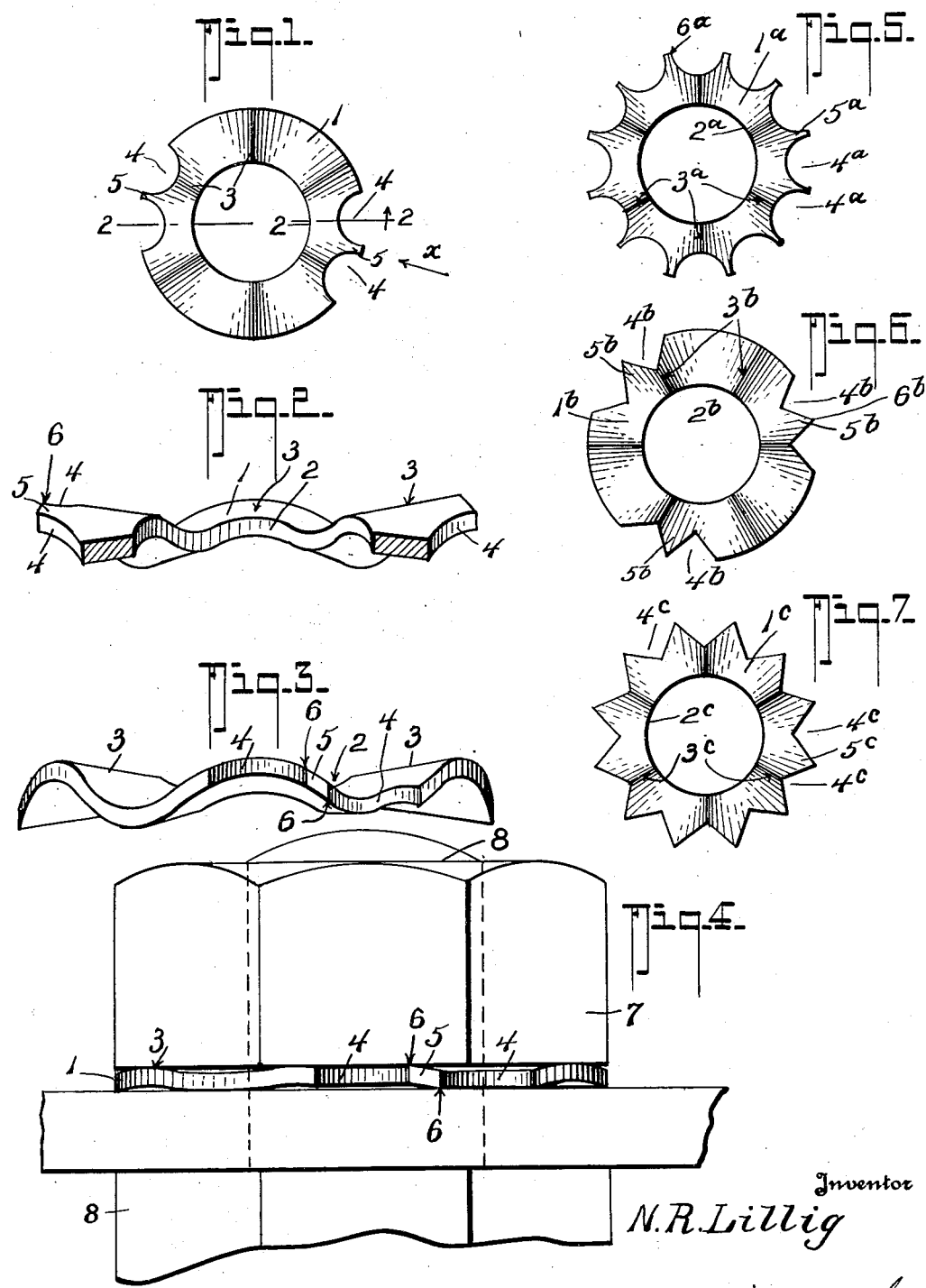
Inventor
N. R. Lillig
By Albert E Dieterich
Attorney Patented Sept. 1, 1931

1,821,312

UNITED STATES PATENT OFFICE

NICHOLAS RICHARD LILLIG, OF PORTLAND, OREGON, ASSIGNOR TO TICE LOCK-WASHER MANUFACTURING CO., OF PORTLAND, OREGON, A CORPORATION OF OREGON

LOCK WASHER

Application filed February 28, 1931. Serial No. 519,188.

My invention relates to certain new and useful improvements in lock washers of the continuous ring type and particularly to those washers which are corrugated or undulated.

Experimentation and scientific tests have shown that the life of a corrugated washer may be considerably increased and the washer may also be made to bear greatly increased loads by providing the washer with notches or cuts in its periphery of sufficient depth to allow the metal of the washer to spread as the washer is flattened out and thus reduce cracking or breaking under excessive flattening pressures to the minimum.

Further, it is an object of the invention to provide a resilient lock washer of undulated form having notches or cuts in the periphery of substantial depth and arranged in pairs at intervals around the periphery whereas a pair of notches will provide between them the digging-in points or edges that hold the washer against turning when a nut is screwed home, consequently holding the nut from working loose.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a face view of the preferred embodiment of my invention.

Figure 2 is an enlarged cross section on the line 2—2 of Figure 1.

Figure 3 is an enlarged edge elevation taken in the direction of the arrow ($x$) in Figure 1.

Figure 4 is a view of the washer shown in Figure 3 after it has been flattened.

Figure 5 is a face view of a modification of the washer shown in Figure 1 in which the washer has its periphery uniformly recessed throughout its entire length, providing a large number of digging-in lugs.

Figure 6 is a face view of another modification in which the recesses are of angular form instead of curved as in the preceding embodiments and in which three sets are employed instead of two as in Figure 1.

Figure 7 is a face view of a modification of the washer shown in Figure 6 in which the recesses of triangular form extend entirely around the periphery of the washer in the manner similar to the modification shown in Figure 5.

In the drawings in which like numerals of reference indicate like parts in all of the figures, 1 represents the body of the washer which consists of a disk having a central bolt hole 2 and being undulated or corrugated as at 3 around its axis. The undulations or corrugations 3 provide alternately high and low places in the washer. The periphery of the washer is provided with recesses or notches 4 which may be curved as in Figures 1 to 5 inclusive, or V-shaped (angular) as in Figures 6 and 7.

I find a washer such as shown in Figures 1 to 4 inclusive is quite satisfactory in practice particularly in the smaller sizes and in that embodiment of the invention two pairs of notches 4 are provided, one pair diametrically opposite the other, and these notches are in close proximity to leave lugs 5 between them, these lugs providing digging-in points at 6—6, see Figures 3 and 4 to hold the washer against turning on its axis when a nut has been screwed home, and consequently holding the nut from unscrewing.

In the embodiment of the invention illustrated in Figure 5 the same notching scheme as shown in Figures 1 to 4 inclusive is employed, but the notches are carried around the entire periphery.

In Figure 5 those parts corresponding to similar parts in Figure 1 bear the same reference numerals plus the index letter ("a").

In Figure 6 is shown a modification in which the notches 4b are of triangular form and those of a pair are so close together as to provide sharp edge lugs at 5b.

In Figure 6 the embodiment shown has three sets of lugs arranged a third of a circle apart, and the same scheme is carried out in Figure 7 wherein the notches extend entirely around the periphery.

In Figure 6 the parts which correspond to similar parts in the preceding figures bear the same reference numerals plus the index letter ("b"), and in Figure 7 the corresponding parts bear the same reference numerals plus the index letter ("c"), so further and more detailed description of Figures 5 to 7 inclusive is thought to be unnecessary.

The disks 1 may be of uniform cross sectional thickness as shown, or they may be of thicker metal adjacent the hole 2 than at the periphery as is the case with the washer disclosed in Figure 8 of my application Serial No. 497,904, filed November 24, 1930, but when the notches 4a, 4b, 4c, as the case may be, are employed I find it is not necessary to vary the cross sectional thickness of the washer.

Tests and experiments have shown that with an undulated washer constructed as herein disclosed, when the nut is screwed down tight and the washer flattened out the metal of the washer is distorted and in a measure apparently displaced into the recesses, thus preventing cracking of the washer which would render it unsatisfactory for further use, or which will prevent its recovery when the pressure shall have been released.

Furthermore, it will be seen that by providing the notches or recesses 4 and extending them a sufficient distance into the body of the washer (and this is particluarly true of the embodiment shown in Figures 5 and 7, and to a lesser degree that of Figure 6) when the flattening action takes place the presence of the notches 4 permits the flattening of the lugs 5a, 5b, 5c at a lesser pressure than would be required to flatten the washer were the notches not there, and consequently the lugs possess a greater degree of resiliency than would be possessed by the un-notched washer. This resiliency assists in holding the nut against working loose even though there be a slight variation in pressure on the washer due to variations in expansion and contraction or from other causes.

It will be noted that the axes of the recesses which lie along the radii of the washer lie at the highest and lowest parts of the undulations. This brings the locking lugs 5 on the inclines of the undulations and thereby exposes the opposite corners of the lugs 6—6 as digging-in points. When the washer body is substantially flattened as shown in Figure 4 the ends of the lugs 5 will not lie parallel to the faces of the nut 7 and body 6 against which the washer is held, the body being located between the head of the bolt and the washer 1.

From the foregoing description, taken in connection with the accompanying drawing, it is thought the complete construction, operation, and advantages of my invention will be clear to those skilled in the art to which it relates.

What I claim is:

1. A lock washer comprising a metal disk having a central bolt hole encircled by an annular undulated body, the undulations of said body being of greatest magnitude at the periphery and of least magnitude at the bolt hole, said body having recesses of substantial depth at the periphery arranged in pairs, the recesses of a pair being adjacent to define locking lugs between them, one of said recesses being located at the peak of an undulation and the other of said recesses being located at the valley of an adjacent undulation.

2. A lock washer comprising a metal disk having a central bolt hole encircled by an annular undulated body, said body having recesses of substantial depth at the periphery arranged in pairs, the recesses of a pair being adjacent to define locking lugs between them, there being three pairs of such recesses spaced a third of a circle apart one of the recesses of a pair being located at the peak of one undulation and the other of said recesses of the pair being located at the valley of an adjacent undulation.

3. A lock washer comprising a metal disk having a central bolt hole encircled by an annular undulated body, said body having recesses of substantial depth at the periphery arranged in pairs, the recesses of a pair being adjacent to define locking lugs between them, there being recesses extending entirely around the periphery of the washer one of the recesses of a pair being located at the peak of one undulation and the other of said recesses of the pair being located at the valley of an adjacent undulation.

4. A lock washer comprising a metal disk having a central bolt hole encircled by a continuous annular body having undulations, the axes of which lie transversely of the body, said body having a peripheral recess at the peak of one undulation and another peripheral recess at the valley of a second undulation.

5. A lock washer comprising a metal disk having a central bolt hole encircled by a continuous annular undulated body, the undulations of said body being of greatest magnitude at the periphery and of least magnitude at the bolt hole, said body having a peripheral recess at the peak of one undulation and another peripheral recess at the valley of another undulation.

NICHOLAS RICHARD LILLIG.